Figure 1:
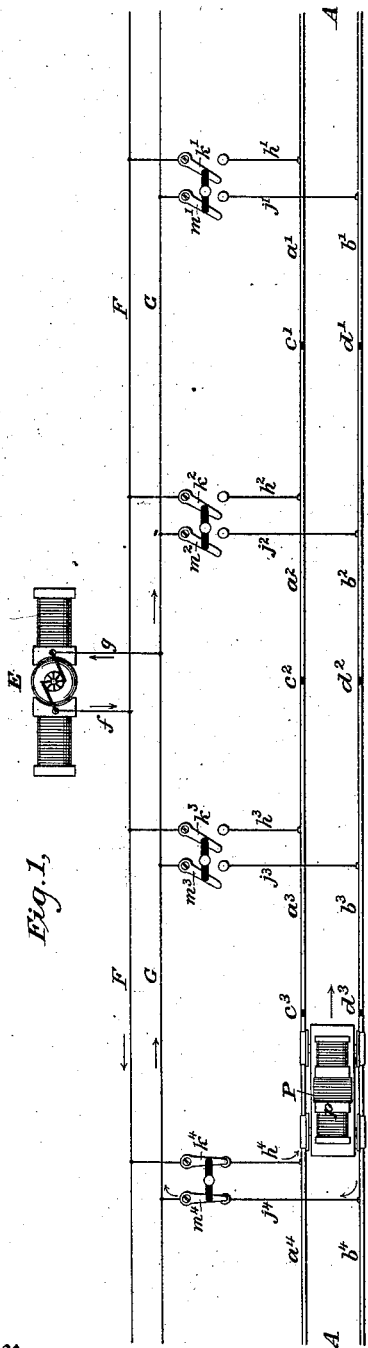

(No Model.)

F. L. POPE.
CIRCUIT FOR ELECTRIC RAILWAYS.

No. 334,608. Patented Jan. 19, 1886.

Witnesses
Geo. W. Breck
Carrie E. Ashley

Inventor
Frank L. Pope;
By his Attorneys
Pope & Edgecomb

UNITED STATES PATENT OFFICE.

FRANK L. POPE, OF ELIZABETH, NEW JERSEY.

CIRCUIT FOR ELECTRIC RAILWAYS.

SPECIFICATION forming part of Letters Patent No. 334,608, dated January 19, 1886.

Application filed December 8, 1884. Serial No. 149,759. (No model.)

*To all whom it may concern:*

Be it known that I, FRANK L. POPE, a citizen of the United States, residing in Elizabeth, in the county of Union and State of New Jersey, have invented certain new and useful Improvements in Circuits for Electric Railways, of which the following is a specification.

My invention relates to apparatus for propelling vehicles upon railroads by electricity; and it consists in an improved organization of circuits and apparatus for conveying the electric current from stationary sources of electricity situated at convenient points along the line of the railroad to the vehicle or vehicles moving thereupon.

In electric-railroad systems heretofore in use two principal methods have been employed for conveying the electric current to the moving vehicle. In one system the track of the railroad is divided into sections of convenient length, the opposite rails of each section being insulated from each other as completely as possible, and each line of rails of each section being in like manner insulated from the abutting rails of the next adjacent section in both directions. Each section thus prepared has its opposite lines of rails permanently connected with the opposite poles of a dynamo-electric generator driven by a steam-engine or other suitable motor. The objections to this system arise mainly from the difficulty which is found in practice in maintaining adequate insulation between the opposite lines of rails. It has been found necessary not only to make use of electric currents of low potential, but also to make the sections as short as possible, so as to reduce the loss of electricity by leakage; but inasmuch as each section must be equipped with a separate generator the cost of the entire equipment for a line of railroad of considerable length becomes very great, while on the other hand the percentage of efficiency is comparatively low.

In order to avoid the objections inherent in the hereinbefore-described system, one or more specially-insulated conductors have been extended for a considerable distance—in some cases even several miles—along the line of railroad-track and parallel thereto. It is obvious that such conductors may be more conveniently and efficiently insulated than the rails of the track, and consequently that a much greater length of railroad may be supplied with electricity from a single dynamo or group of dynamos without material loss; but, on the other hand, this system renders necessary the employment of a traveling contact apparatus to maintain an uninterrupted electrical connection between the conductor and the moving vehicle or vehicles. Devices of this kind have been found inconvenient and unsatisfactory in their operation, and especially liable to derangement when the speed of the vehicle is very great.

In my invention I have sought to combine the advantages and avoid the disadvantages of the two systems hereinbefore described. The railroad-track is divided into insulated sections, as in the first-described system, which sections may be of any convenient or desirable length. Instead, however, of attaching a special dynamo to each insulated section, I make use of a single generator or group of generators for a considerable number of sections. I convey the electrical current from the opposite poles of the generator by means of two special insulated conductors, which extend along the line of the railroad and parallel thereto for a sufficient distance to embrace two, three, or any desired number of track-sections. Branch conductors are provided by means of which the opposite insulated lines of rails of each section are, when required, connected, respectively, with the positive and negative electric conductors extending from the generator. Circuit-controlling devices are placed in each of these branches, which circuit-controllers are actuated either manually or automatically to form a connection between the opposite rails of each track-section and the poles of the generator during such time only as the moving vehicle is occupying such section or a portion of it. By this means the leakage is confined to the particular section which is being traversed by the vehicle, all the other sections being wholly disconnected therefrom. The sections may consequently be made very short in places where the insulation of the rails is maintained with difficulty—as, for example, in wet tunnels and in moist ground—while they may be made of much greater length on dry ground or upon bridges and trestles. By this means special contact devices for making connection between the moving vehicle and the stationary conductors may be entirely dispensed with, the current being transmitted from the rails to the traveling motor through the wheels of the vehicle or vehicles.

The invention also comprises certain apparatus for automatically controlling electric currents passing through the branch circuits to the rail-sections.

Figure 2:
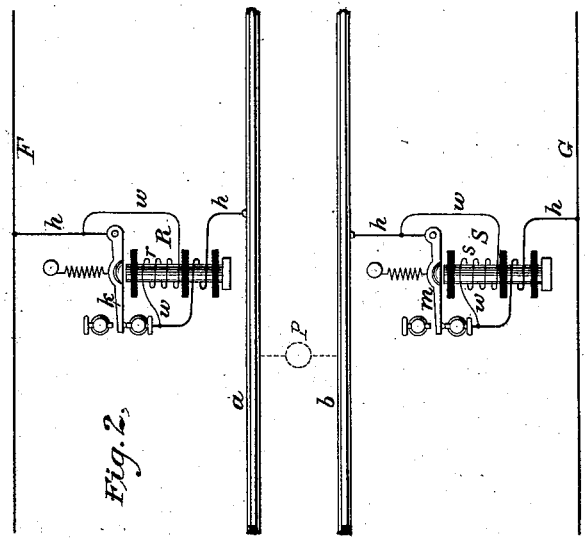

In the accompanying drawings, Figure 1 is a diagram illustrating my invention; and Fig. 2 represents a modification of the same, in which the circuit-controlling apparatus is actuated automatically by the movement of an electrically-propelled vehicle along the railway.

In the figures, A A represent a railway-track which is divided into insulated sections of convenient length, as shown at $a'b'$, $a^2 b^2$, $a^3 b^3$, and $a^4 b^4$. The abutting ends of the rails which form the terminations of these sections are rendered mechanically continuous but electrically discontinuous by the interposition of insulated rail-joints, which may be constructed in any suitable or well-known manner—such, for example, as that described in my former Letters Patent, No. 129,425, of July 16, 1872, to which reference is had. These insulating-joints are inserted in the track at proper intervals, and separate the adjacent sections from each other, as shown at $c' d'$, $c^2 d^2$, and $c^3 d^3$. This method of dividing a railroad-track into insulated sections is well known in connection with the art of automatic railway-signaling, and in itself forms no part of the present invention. It may be remarked, however, that it is desirable in practice to apply a special conducting-connection between the abutting ends of the adjacent rails, which constitute the insulated section. Such a connection is shown and described in the patent of Gassett and Fisher, No. 227,102, of May 4, 1880. The length of the insulated sections of track need not be uniform, but may with advantage vary, according to circumstances, from, say, five hundred to two thousand feet in length. The more perfect the insulation of the track the longer the section may be made.

Two insulated electrical conductors, F and G, are extended along the line of the railroad, and parallel and in convenient proximity thereto. These conductors are preferably formed of thick copper wires or rods, and may be either suspended in the air and attached to posts by suitable insulators, in the manner of an ordinary telegraph-line, or they may be placed in tubes above or beneath the surface of the ground, or arranged in any other convenient manner. The length of these conductors is immaterial; but it will generally be found convenient to make them not more than ten miles in length. At some convenient point, preferably about midway of the length of the conductors, a suitable source of electricity is established, preferably consisting of a dynamo-electric machine, E, which may be either a single large machine or a group of smaller machines, having their terminals united in parallel circuit or multiple arc, and driven by a steam-engine or other convenient prime motor. The positive and negative terminals of this electric generator are respectively united by the feeders $f$ and $g$ to the main conductors F and G. The opposite insulated lines of rails of each track-section may be respectively connected with the insulated conductors F and G. For example, the rail-section $a'$ may be connected with the conductor F by the branch conductor $h'$, and the opposite rail-section $b'$ with the conductor G by the branch $j'$. In like manner the branch $h^2$ connects the rail-section $a^2$ with the conductor F, and the branch $j^2$ the rail-section $b^2$ with the conductor G, and so on. Each of the branches $h'$, $j'$, &c., is normally open, being provided with a key or circuit-controller, as seen at $k' k^2$, $m' m^2$, &c. These when closed establish an electric connection between the conductors F and G and the insulated lines of rail. When the opposite insulated lines of rail of any particular section of track are thus placed in electrical connection with the opposite poles of the generator E, and a suitable electric locomotive is placed thereupon, consisting of a car, truck, or other vehicle having metallic wheels running upon said rails and insulated from each other in such a way that an electrical connection may be formed through said wheels and through an electric motor mounted upon said vehicle, it will be understood that said vehicle may be propelled by the action of said motor along the track A A. Such a locomotive is shown at P, having a suitable electric motor, $p$, mounted thereon.

In the drawings the circuit-controllers $k^4 m^4$ are shown as closed, and the electric current accordingly passes, as indicated by the arrows, from the generator E along the conductor F, and through the circuit-controller $h^4$ and branch $k^4$ to the insulated track-rail $a^4$, thence through the wheels of the locomotive P and the motor $p$, passing out again through the opposite rail of the insulated rail-section $b^4$, branch conductor $j^4$, and circuit-controller $m^4$ to the conductor G, and thence through said conductor and the feeder $g$ to the opposite pole of the generator. The locomotive will thus be propelled along the track A A in the direction of the arrow until it reaches the insulated section $a^3 b^3$, when the circuit-controllers $k^4 m^4$ are simultaneously thrown open, while those at $k^3$ and $m^3$ are simultaneously closed. The current is now thrown upon the section $a^3 b^3$, and the locomotive is made to traverse that section in the same manner.

It is to be understood that the direction in which the vehicle moves upon the railroad is determined by means of appliances placed upon the vehicle itself and under control of its driver, and that it does not depend in any manner upon the direction of the electric current traversing the conductors and insulated track-sections.

It is obvious that this system might be successfully operated by stationing a person at each circuit-controller or pair of circuit-controllers—as, for instance at $k^4 m^4$,—whose duty it should be to simultaneously close the branch circuits $h^4 j^4$ upon the entrance of the locomotive upon the corresponding section, $a^4 b^4$, to keep the same closed while said locomotive is passing over the section, and to open the same as soon as the vehicle shall have passed off from the section. It is, however, much more economical and convenient to actuate the circuit controllers automatically. I have shown in Fig. 2 an apparatus whereby this is effected. Each circuit-controller—as, for example, $k$ and $m$—is attached to the armature of an electro-magnet, R S. These electro-magnets have helices of thin wire, $r\ s$, offering a considerable resistance to the passage of an electric current, and their terminals $w\ w$ are united to the normally severed ends of the branch conductors $h\ h$, so as to form a shunt of high resistance bridging the break formed by the circuit-controller when open. The resistance of this shunt-circuit and its included electro-magnetic helix is so great that the amount of electricity which normally passes through it is comparatively insignificant, especially as the current is compelled also to traverse the resistance of the insulation between the opposite rails $a\ b$ of the section. When, however, these rails are electrically connected together by the entrance of a locomotive or vehicle, P, upon the section, the current passing through the electro-magnets R and S is considerably increased, the armatures are attracted, and the breaks in the branch circuits $h\ h$ are closed, thus permitting the full strength of the current to flow from the conductors F G to the rails of the track. When the vehicle P passes off from the section, the interruption of the circuit takes place first at the point of contact between the wheels and the rails, and not at the point of contact of the circuit-controllers, and thus the spark is produced at a point where it cannot do any harm, and cannot interfere in the least with the proper working of the apparatus.

From the foregoing description it will be understood that the electro-magnets R and S are maintained under the uninterrupted control of the electric locomotive so long as the latter occupies any portion of the insulated lines of rails which are included with the said electro magnet or magnets in an electric circuit to which said locomotive forms a movable circuit-closer, and that the supply of electricity which actuates said locomotive is determined by a circuit-controller actuated by the armature or armatures of said electro magnet or magnets. This circuit-controlling apparatus is preferably duplicated, in order that the rails of the track may be wholly disconnected from both the positive and negative poles of the generator when not in use by the locomotive, in order to prevent all unnecessary waste of electricity. The amount of leakage which takes place through the high resistance of the helices $r\ s$ when the locomotive is not on the section is so small as to be practically negligible.

In this system it is not necessary to employ any means of insulating the opposite rails from each other or from the earth, except to place them upon cross-ties of wood, as the loss by leakage is comparatively small unless a considerable length of track is included in the section. The sections may, however, be made quite short where circumstances require it, and the leakage thus reduced to a minimum.

I am aware that it has been proposed to make use of a series of insulated sections of rails for the purpose of supplying an electric current to a vehicle moving thereupon, which sections derive their actuating current from a continuous insulated main or supply conductor, said sections being automatically brought into connection with the main conductor only when a vehicle is passing over such section, and not at other times; and hence I do not desire to broadly claim the combination of elements by which this result is effected.

I claim as my invention—

1. The combination, substantially as hereinbefore set forth, of a railroad-track divided into two or more sections insulated from each other and from the earth, a generator of electricity, positive and negative conductors extended from the respective poles of said generator along the line of said railroad, branch conductors uniting the opposite lines of rails of each insulated section of track with said positive and negative conductors, respectively, and circuit-controllers, whereby the current for actuating an electrically-moved vehicle is permitted to traverse each of said branches only while said vehicle is passing over the insulated section of track connected with said branch.

2. The combination, substantially as hereinbefore set forth, of a railroad-track, mechanical and electrical connections between the abutting rails thereof, insulating material interposed between the rails and their connections and supports at such intervals as to divide the track into sections electrically insulated from each other and from the earth, a generator of electricity, insulated positive and negative conductors extending from the opposite poles of said generator uninterruptedly along two or more sections of said track, branch conductors uniting the opposite lines of rails of each insulated section with said positive and negative conductors, respectively, and circuit-controllers, whereby the current for actuating an electrically-moved vehicle is permitted to traverse each of said branches only while said vehicle is passing over the insulated section of track connected with said branch.

3. The combination, substantially as hereinbefore set forth, of an electrically connected and insulated line of rails in a railroad-track, a conductor connecting said line of rails with a source of electricity, and a normally-open-circuit-controller placed in said conductor, which is actuated by an electro-magnet having its coils included in a shunt of comparatively high resistance spanning said circuit-controller.

4. A railroad-track having its opposite lines of rails electrically insulated from each other, two electric conductors which unite said opposite lines of rails respectively with the opposite poles of a generator of electricity, and two circuit-controllers—one in each of said conductors—which are simultaneously actuated to admit an operative electric current to said track or to interrupt the same.

In testimony whereof I have hereunto subscribed my name this 6th day of December, A. D. 1884.

FRANK L. POPE.

Witnesses:
   DANL. W. EDGECOMB,
   CHARLES A. TERRY.